Sept. 4, 1951     O. I. THORSEN     2,566,813
ICE WARNING INDICATOR
Filed Dec. 1, 1949     2 Sheets-Sheet 1
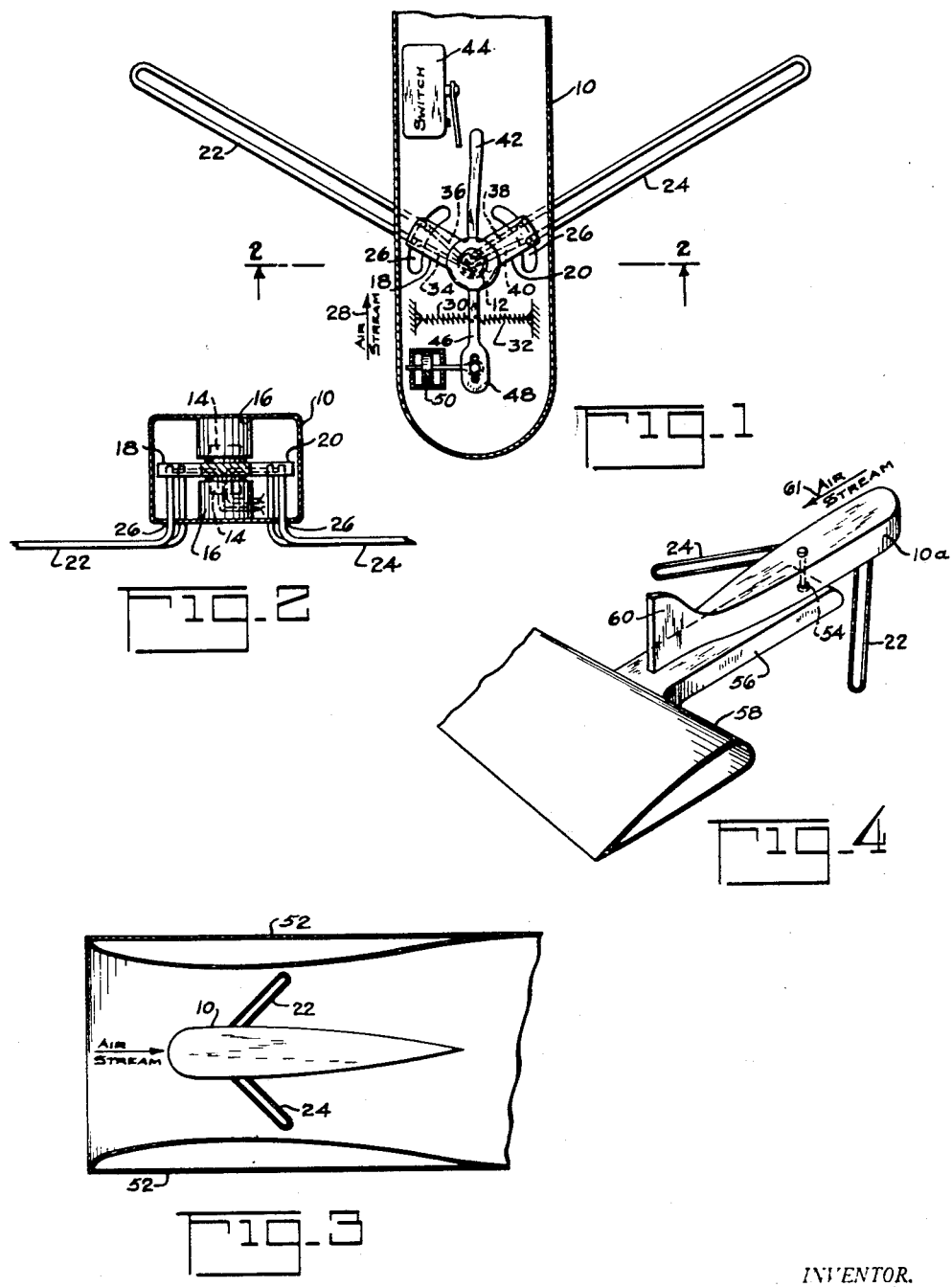
INVENTOR.
OLE I. THORSEN.
BY *Victor D. Behr*
ATTORNEY Sept. 4, 1951 O. I. THORSEN 2,566,813
ICE WARNING INDICATOR
Filed Dec. 1, 1949 2 Sheets-Sheet 2

INVENTOR.
OLE I. THORSEN.
BY *Victor D. Behr*
ATTORNEY

Patented Sept. 4, 1951

2,566,813

UNITED STATES PATENT OFFICE 2,566,813

ICE WARNING INDICATOR

Ole Iver Thorsen, Inglewood, Calif., assignor to Wright Aeronautical Corporation, a corporation of New York Application December 1, 1949, Serial No. 130,550

6 Claims. (Cl. 177—311)

This invention relates to anti-icing systems and is particularly directed to means for indicating the presence of icing conditions in the air flowing over a part or parts of an aircraft and/or to means for preventing accumulation of ice on said parts and/or to removing any such accumulation.

Under certain atmospheric conditions ice will accumulate on structural aircraft parts over which the air flows and not infrequently such accumulation may be quite rapid. Accordingly, in order to hold the power absorbed by the aircraft anti-icing equipment to a minimum it is necessary that means be provided for accurately and promptly detecting the presence of icing conditions in the atmosphere. In addition, the anti-icing equipment should operate only so long as its operation is necessary for the prevention of ice accumulation on the aircraft. An object of the present invention comprises the provision of novel means for accurately and quickly detecting and warning the pilot of the presence of icing conditions in the surrounding atmosphere or in the air flowing over certain structural parts of the aircraft. A further object of the present invention comprises the provision of a novel automatic anti-icing control system.

In accordance with the present invention, the ice warning indicator comprises a pivotally mounted member over which air flows, the aerodynamic drag forces on said member being balanced about the pivot axis of said member when there are no ice forming conditions in said air. When, however, ice forming conditions exist in the air flowing over said pivotally mounted member, ice will accumulate on said member to unbalance the aerodynamic drag forces on said member whereupon said member rotates about its axis to energize an indicator and/or to initiate automatic operation of an anti-icing system for the aircraft. The pivotally mounted ice responsive member comprises a normally heated portion and a normally unheated portion whose aerodynamic drag forces exert opposed turning moments on the pivotally mounted ice responsive member. When icing conditions exist in the air flow over the ice responsive member, ice accumulates on the normally unheated portion of said member but not on its normally heated portion so that the aerodynamic drag force on said unheated portion increases and causes rotative movement of said member. Accordingly this rotative movement is indicative of the presence of icing conditions in the air flowing over said member and can be used to energize or operate an indicator to warn the pilot of this fact.

Where said ice responsive member initiates automatic operation of an anti-icing system in addition to or instead of operating an indicator, said system may have the following cycle of operation: The normally unheated portion of said member is heated for a first predetermined time interval sufficient to remove any ice therefrom, and aircraft anti-icing means is energized for a second and longer time interval. If icing conditions still exist at the end of said first time interval then ice will again form on the normally unheated portion of the ice responsive member, thereby again unbalancing said member, and if this unbalance continues to exist to the end of said second time interval the cycle is repeated.

Other objects of the invention will become apparent upon reading the annexed detailed description in connection with the drawing in which:

Figure 1 is a view illustrating an ice responsive member and support therefor embodying the invention;

Figure 2 is a sectional view taken along line 2—2 of Figure 1;

Figure 3 is a sectional view illustrating the structure of Figures 1 and 2 mounted within a Venturi type duct;

Figure 4 illustrates a modification of Figure 3 in which the supporting structure for the ice responsive member comprises a pivotally mounted vane.

Figure 5:
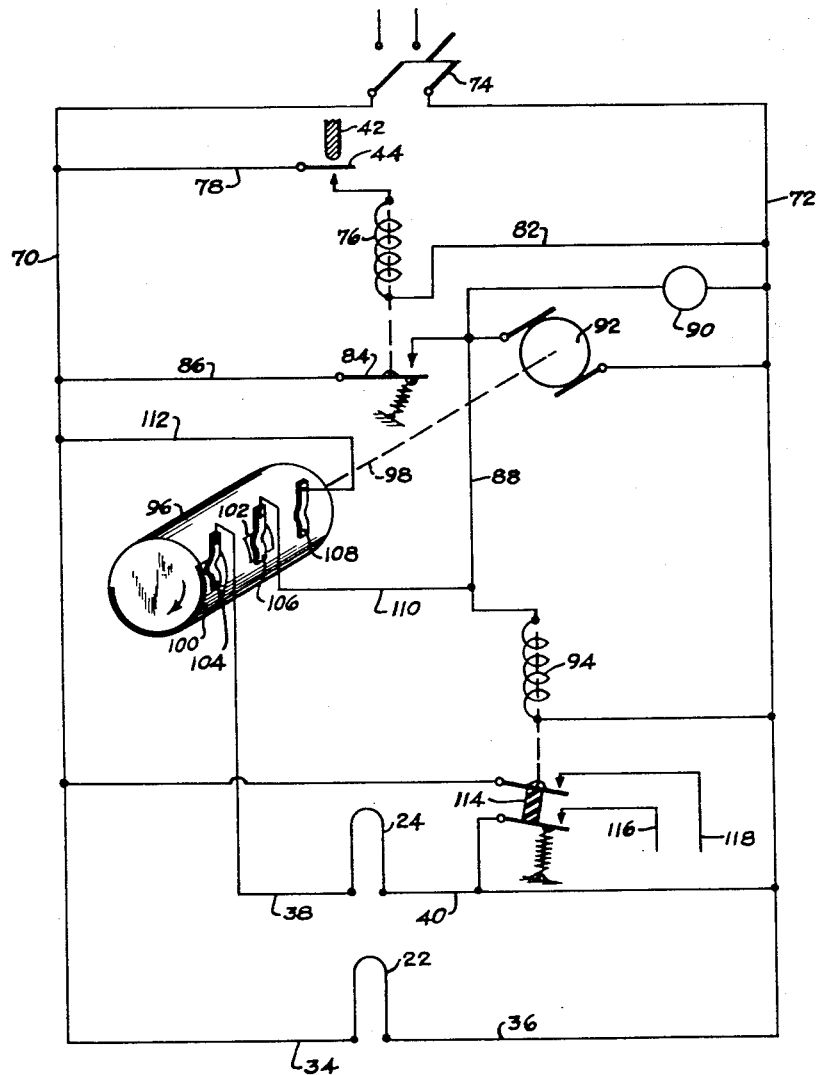
Figure 5 is a diagrammatic view of an automatic anti-icing control system.

Referring first to Figures 1 and 2 of the drawing, a streamlined body 10 is carried by the aircraft for air flow thereover. A rocker member 12 is pivotally mounted within and supported by the body 10 by trunnions 14 journaled in bosses 16 rigid with the body 10. The rocker member 12 has a pair of arms 18 and 20, said arms being similar but inclined to each other. Identical small loops of wire 22 and 24 are secured to and form extensions of the arms 18 and 20 respectively, said arms projecting through elongate arcuate slots 26 in the body 10 to permit limited rotative movement of the rocker member 12. The wire arms 18 and 20 are identical and when symmetrically positioned relative to the direction of air flow (indicated by the arrow 28 in Figure 1), the turning moments exerted on the rocker member 12 by the aerodynamic drag forces on said wire arms are equal but opposite. In this symmetrical position of the rocker member 12 and its wire arms 22 and 24 the air flow direction is parallel to the bisector of the angle between said arms.

Light centering springs 30 and 32 are provided for urging the rocker member 12 to said symmetrical position. Preferably said springs are oppositely wound about the trunnions 14, but for clarity said springs have been schematically illustrated in the drawing spaced from said trunnions.

One of the wire arms, for example, the wire arm 22, is arranged to be heated by an electric current to prevent ice accumulations thereon. For this purpose the wire arm 22 is made of a suitable electric resistance alloy, as for example "Nichrome," an alloy of nickel and chromium. The wire arm 24 is made of similar material. In addition, the two inner ends of the loop forming the wire arm 22 are connected to electric conductor wires 34 and 36 which extend through the associated rocker arm 18 and one of the trunnions 14 and thence out through the associated trunnion supporting boss 16 to a source of electric energy. Similarly, electric conductor wires 38 and 40 may also be connected to the two ends of the loop of the other wire arm 24 for a purpose hereinafter described, although the wire arm 24 normally is unheated.

Under certain operating conditions of the air flowing over the body 10 and the wire arms 22 and 24, ice will accumulate on structural parts over which said air flows. Sufficient electric current is passed through the wire arm 22 so that its temperature is high enough to prevent any accumulation of ice thereon. Accordingly, as to the two wire arms 22 and 24, ice will accumulate only on the wire arm 24. As a result, the turning moment exerted on the rocker member 12 by the aerodynamic drag force on the wire arm 24 will exceed the opposite turning moment exerted by the aerodynamic drag force on the wire arm 22 so that the rocker member will immediately rotate counter-clockwise as viewed in Figure 1. This counter-clockwise rotational movement of the rocker member 12 from its normal symmetrical position relative to the air flow is indicative of the presence of icing conditions in the air flowing over its wire arms 22 and 24. Therefore, rotative movement of said rocker member in response to the presence of icing conditions in the air flowing over said member can be used to operate an indicator to warn the pilot of said conditions. For this latter purpose the ice responsive rocker member 12 is provided with a third arm 42 which is adapted to close a small switch 44 when the rocker member rotates counter-clockwise from its normal position. Switch 44, when closed, may energize a suitable indicator in the pilot's cockpit.

Preferably the body 10 is also heated to prevent the accumulation of ice thereon, since accumulation of ice on said body might interfere with pivotal movement of the rocker member 12. In addition each arm 22 and 24, instead of comprising a loop of wire, may comprise a solid or hollow arm electrically heated in any suitable manner.

The rocker member 12 is also provided with a fourth arm 46 having a weight 48 on its forward end to counterbalance the other arms of said member in order that the center of mass of the rocker member 12 and its arms is on the pivot axis of said member whereby the force of gravity exerts no turning moment on said rocker member regardless of the attitude of the aircraft. In addition, a piston type viscous damper or dash pot 50 is connected to the arm 46 to minimize vibrations or oscillations of the rocker member 12, caused by other than icing conditions, which might otherwise operate the switch 44 to give a false signal.

When the rocker member 12 is disposed in the position illustrated in Figure 1 and there is no ice accumulation on either of its two wire arms 22 and 24, then the aerodynamic drag forces on said two wire arms are equal only if the direction of the air flow is symmetrical relative to said arms. For example, a change in the direction of said air flow might cause the rocker member 12 to rotate and close the switch 44 even though no ice had accumulated on the wire arms 24, thereby giving a false indication of icing conditions in the air. It is essential, therefore, that means be provided to make sure that the air flows over the rocker member supporting body 10 in the direction indicated in Figure 1. For this purpose, the body 10, its rocker member 12 and associated structure of Figures 1 and 2 are supported within a Venturi tube-like duct 52 (Figure 3), said duct being supported on the aircraft for air flow therethrough from the surrounding atmosphere. With such a duct 52, the air will flow through said duct in a direction parallel to the duct axis in spite of variations in the entrance angle of said air into said duct. With this arrangement of Figure 3, air always flows over the body 10 in the predetermined direction relative to said body indicated by the arrows in Figures 1 and 3. Like the body 10, the walls of the duct 52 are preferably heated to prevent the accumulation of ice on said walls. Except for the disposition of the body 10 within the duct 52 the structure of Figure 3 is identical to that of Figures 1 and 2.

In lieu of the arrangement of Figure 3, the body 10 may be modified, as illustrated in Figure 4, to comprise a vane 10a disposed in the airstream flowing over the aircraft and pivotally mounted at 54 on a strut 56 extending from a wing 58 or from other fixed structure of the aircraft. The center of mass of the vane 10a is disposed substantially at its pivot axis 54 and said vane has a tail surface 60 whereby said vane automatically points into the direction of the air flow relative to the aircraft regardless of the attitude of said aircraft. In addition a viscous damper, similar to the damper 50 may be connected between the vane 10a and the strut 56 to minimize oscillations of said vane. With this arrangement of Figure 4, air always flows over the vane 10a in a predetermined direction relative to said vane, as indicated by the arrow 61. Except that the rocker member supporting body has been modified to comprise a pivotally mounted vane, the structure of Figure 4 is otherwise identical to that of Figures 1 and 2.

With the aforedescribed structure, the rocker member 12 is sensitive only to the accumulation of ice on its arm 24 and when ice does accumulate on said arm the rocker member quickly rotates to operate the switch 44 thereby energizing a warning signal. Upon energization of the ice warning signal by the switch 44, the pilot can immediately initiate operation of any aircraft anti-icing means. For example, in the case of an aircraft having a power plant equipped with the anti-icing screen illustrated in copending application Serial No. 25,956, filed May 8, 1948, now Patent No. 2,507,018, in the name of Jewett et al., upon operation of the ice warning signal the pilot would close the electric circuit to said screen. Where, as in said copending application, icing is to be prevented in an air intake duct the ice responsive member 12 should be located in said duct rather than in the surrounding atmosphere. This is so because, due to differences in the temperature and/or pressure between the air in said duct and in the surrounding atmosphere, icing conditions may exist in said duct when they do not in the surrounding atmosphere.

Instead of manually controlling the operation of the aircraft anti-icing means, the ice responsive rocker member may initiate and automatically control operation of said anti-icing means. An automatic anti-icing control system is illustrated in Figure 5. The wire arms 22 and 24 are schematically illustrated in Figure 5, the wire arm 22 being connected across a pair of electric supply conductors 70 and 72 by the wires 34 and 36. The electric supply conductors 70 and 72 are connected to opposite sides of a source of electric energy through a main switch 74, whereby the wire arm 22 is continuously heated when said switch 74 is closed. The ice responsive switch 44 and switch operating arm 42 are also schematically illustrated in Figure 5. When the ice responsive switch 44 is closed, a circuit is completed across the conductors 70 and 72 to a relay 76, said circuit including the wires 78 and 82. Operation of the relay 76 closes a normally open switch 84. Closure of the switch 84 completes a circuit from the supply conductor 70 through a wire 86, the switch 84, a wire 88, and then through an indicator 90, a motor 92 and a relay 94 to the supply conductor 72. The indicator 90, motor 92 and relay 94 are connected in parallel.

The indicator 90 may comprise an electric lamp positioned in the pilot's cockpit, but said indicator is not essential to the operation of the automatic anti-icing system. The motor 92 is drivably connected to a metallic electric conducting drum 96 through suitable speed reduction gearing schematically indicated at 98. The drum 96 is provided with two electric insulating strips 100 and 102. As illustrated, the strip 100 extends somewhat more than half way around the drum, while the strip 102 subtends only a very small angle about the drum axis. During rotation of the drum 96, the insulating strips 100 and 102 are arranged to break electric contact between the drum 96 and electric terminals 104 and 106 for a length of time dependent on the length of said strips. A third electric terminal 108 is in continuous electrical contact with the conducting drum 96. The electric terminal 104 is connected to one side of the wire arm 24 by the wire 38, while the other side of said arm is connected to the supply conductor by the wire 40. The electric terminal 106 is connected by a wire 110 to the wire 88. The electrical terminal 108 is connected to the supply conductor 70 by a wire 112. The relay 94, when energized, closes a normally open switch 114, said switch in turn completing a circuit to wires 116 and 118 to cause operation or energization of aircraft anti-icing mechanism, as for example the anti-icing screen of the aforementioned copending application.

When the main switch 74 is closed, the system of Figure 5 operates as follows: The wire arm 22 is heated continuously. When ice accumulates on the wire arm 24 the ice responsive switch 44 closes, as described in connection with Figures 1 and 2, thereby energizing the relay 76 and closing its switch 84. Upon closure of the switch 84 the indicator 90, the motor 92 and the relay 94 are energized. Operation of the relay 94 closes its switch 114 to cause operation of the aircraft anti-icing means connected to said switch. Operation of the motor 92 causes the electric conducting drum 96 to rotate from the position illustrated and in the direction indicated. As soon as the drum has rotated a small amount the insulating strip 102 moves out from under the terminal 106, whereupon a holding circuit is completed to the motor 92 and relay 94, said holding circuit being independent of the ice responsive switch 44. This holding circuit insures operation of the motor 92 for a complete revolution of the drum and maintains energization of the aircraft anti-icing means while the drum is rotating. Accordingly the aircraft anti-icing means is held in operation at least for a time interval equal to the time required for the drum to make one revolution. As soon as the drum 96 rotates said small amount a circuit is also completed to the normally unheated wire arm 24 through the terminal 104 and the drum 96 thereby heating the arm 24. This circuit for the arm 24 remains closed long enough to remove the ice accumulation on said arm but this circuit is broken by the strip 100 before the completion of one revolution of the drum. As illustrated, the circuit to the arm 24 is broken somewhat before the drum has completed one-half the revolution and said circuit remains broken for the remainder of said revolution. When the circuit of the wire arm 24 is broken, said arm will quickly cool off and if icing conditions still exist in the air flowing over said arm ice will again accumulate thereon. The timing is such that there is sufficient time between the opening of the circuit of the arm 24 for ice to again accumulate on said arm before the drum 96 has completed its revolution. If ice again accumulates on the arm 24 the ice responsive switch 44 will again be closed whereupon at the end of the revolution of the drum 96 the circuit to the drum motor 92 will not be broken at the insulating strip 102, but said circuit will be completed through the switch 84, whereupon the cycle is repeated as long as the icing conditions exist. If, however, icing conditions no longer exist when the circuit is broken to the wire arm 24 by the insulating strip 100, then when the drum 96 completes its revolution the circuit to both the motor 92 and the relay 94 will be broken by the insulating strip 102 whereupon the drum 96 will stop in the position illustrated and the aircraft anti-icing system controlled by the switch 114 will be shut off.

The drum 96 may take five minutes to complete a cycle or one revolution in which case, upon the occurrence of icing conditions in the air, the aircraft anti-icing means will operate for at least a time interval of five minutes and said anti-icing means will operate for additional five minute periods as long as said icing conditions continue to exist. With the drum 96 taking five minutes to complete one revolution, the normally unheated wire arm 24 may be heated for a time interval of two minutes at the start of each cycle. These numerical values of said time intervals are given only by way of example since their actual magnitudes will depend on such factors as the particular aircraft anti-icing means controlled by the system.

The function of the above described automatic anti-icing system under the control of the ice responsive switch 44 could be performed by many different electric circuit arrangements in addition to the circuit of Figure 5. Furthermore, the aircraft anti-icing means need not comprise an electrical heating circuit, since many other types of anti-icing means are used on aircraft. For example, a heating fluid may be used for heating the aircraft parts on which the accumulation of ice is to be prevented, or an anti-icing fluid such as alcohol or glycerin may be fed over said parts. In addition, the anti-icing means may comprise a rubber-like boot over the aircraft part on which the accumulation of ice is to be prevented, said boot being expansible by the application of a fluid pressure thereto, thereby breaking off any accumulation of ice. Accordingly, instead of controlling an electrical heating circuit, the relay 94 could, for example, control a valve for regulating an anti-icing heating fluid, an anti-icing fluid such as alcohol, glycerin or air, a fluid pressure for an anti-icing boot, and/or some other means for controlling the operation of an aircraft anti-icing system.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In an anti-icing system for aircraft; a pivotally mounted member, said member having first and second portions disposed for air flow thereover such that the turning moment exerted on said member by the aerodynamic drag force on said first portion opposes the turning moment exerted on said member by the aerodynamic drag force on said second portion; and means for heating said first portion to a temperature above that of said second portion so that when icing conditions exist in the air flowing over said portions ice accumulates to a greater extent on said second portion and the resulting increase in the aerodynamic drag force on said second portion relative to that on said first portion causes rotative movement of said member whereby said rotative movement is indicative of icing conditions in said air.

2. In an anti-icing system for aircraft; a pivotally mounted member having first and second arms extending in different directions from said member and disposed for air flow thereover such that the turning moment exerted on said member by the aerodynamic drag force on said first arm opposes the turning moment exerted on said member by the aerodynamic drag force on said second arm; and means for heating said first arm to a temperature above that of said second arm so that when icing conditions exist in the air flowing over said arms ice accumulates to a greater extent on said second arm and the resulting increase in the aerodynamic drag force on said second arm relative to that on said first arm causes rotative movement of said member whereby said rotative movement is indicative of icing conditions in said air.

3. In an anti-icing system for aircraft; a pivotally mounted member having first and second similar arms extending in different directions from said member and disposed for air flow thereover such that the turning moment exerted on said member by the aerodynamic drag force on said first arm opposes the turning moment exerted on said member by the aerodynamic drag force on said second arm; and means for continuously heating only said first arm to prevent the accumulation of ice thereon so that when icing conditions exist in the air flowing over said arms ice accumulates on only said second arm and the resulting increase in the aerodynamic drag force on said second arms causes rotative movement of said member whereby said movement is indicative of icing conditions in said air.

4. In an anti-icing system for aircraft; a support member on said aircraft disposed for air flow thereover; a member pivotally mounted on said support member and having first and second arms extending in different directions from said pivotally mounted member; means for causing air to flow over said support member in a predetermined direction relative thereto whereby the aerodynamic drag forces on said arms normally cause said pivotally mounted member to assume a predetermined rotative position relative to said supporting member; and means for heating said first arm to a temperature above that of said second arm so that when icing conditions exist in the air flowing over said arms ice accumulates to a greater extent on said second arm and the resulting increase in the aerodynamic drag force on said second arm relative to that on said first arm causes rotative movement of said pivotally mounted member from said predetermined position whereby said rotative movement is indicative of icing conditions in said air.

5. In an anti-icing system for aircraft; a hollow duct on said aircraft through which air flows from the surrounding atmosphere parallel to the duct axis; a member pivotally mounted in said duct and having first and second arms inclined relative to each other, said arms being similar so that the aerodynamic drag forces resulting from the air flowing over said arms normally so position said member that the bisector of the angle between said arms is parallel to the axis of said duct; means for heating said first arm to a temperature above that of said second arm so that when icing conditions exist in the air flowing over said arms ice accumulates to a greater extent on said second arm and the resulting increase in the aerodynamic drag force on said second arm relative to that on said first arm causes rotative movement of said member about its pivot axis whereby said rotative movement is indicative of icing conditions in the air flowing through said duct.

6. In an anti-icing system for aircraft; a vane pivotally mounted on said aircraft and disposed in the path of air flowing over said aircraft so as to assume a predetermined position relative to the direction of said air flow; a member pivotally mounted on said vane and having first and second similar but inclined arms extending therefrom in the path of said air flow so that the aerodynamic drag forces on said arms normally cause said member to assume a predetermined rotative position relative to said vane in which the direction of said air flow is parallel to the bisector of the angle between said arms; and means for heating said first arm to a temperature above that of said second arm so that when icing conditions exist in the air flowing over said arms ice accumulates to a greater extent on said second arm and the resulting increase in the aerodynamic drag force on said second arm relative to that on said first arm causes rotative movement of said pivotally mounted member from said predetermined position whereby said rotative movement is indicative of icing conditions in said air.

OLE IVER THORSEN.

REFERENCES CITED

The following references are of record in the file of this patent:

UNITED STATES PATENTS

| Number | Name | Date |
|---|---|---|
| 2,159,186 | Tyler | May 23, 1939 |
| 2,373,255 | McGoldrick | Apr. 10, 1945 |
| 2,414,756 | May | Jan. 21, 1947 |
| 2,494,877 | Idrac | Jan. 17, 1950 |